Sept. 25, 1956 E. D. DALL 2,764,330
LATCHING MEANS FOR TIRE CARRIERS OR SIMILAR DEVICES
Filed Jan. 12, 1953 3 Sheets-Sheet 1

Inventor
Edward D. Dall

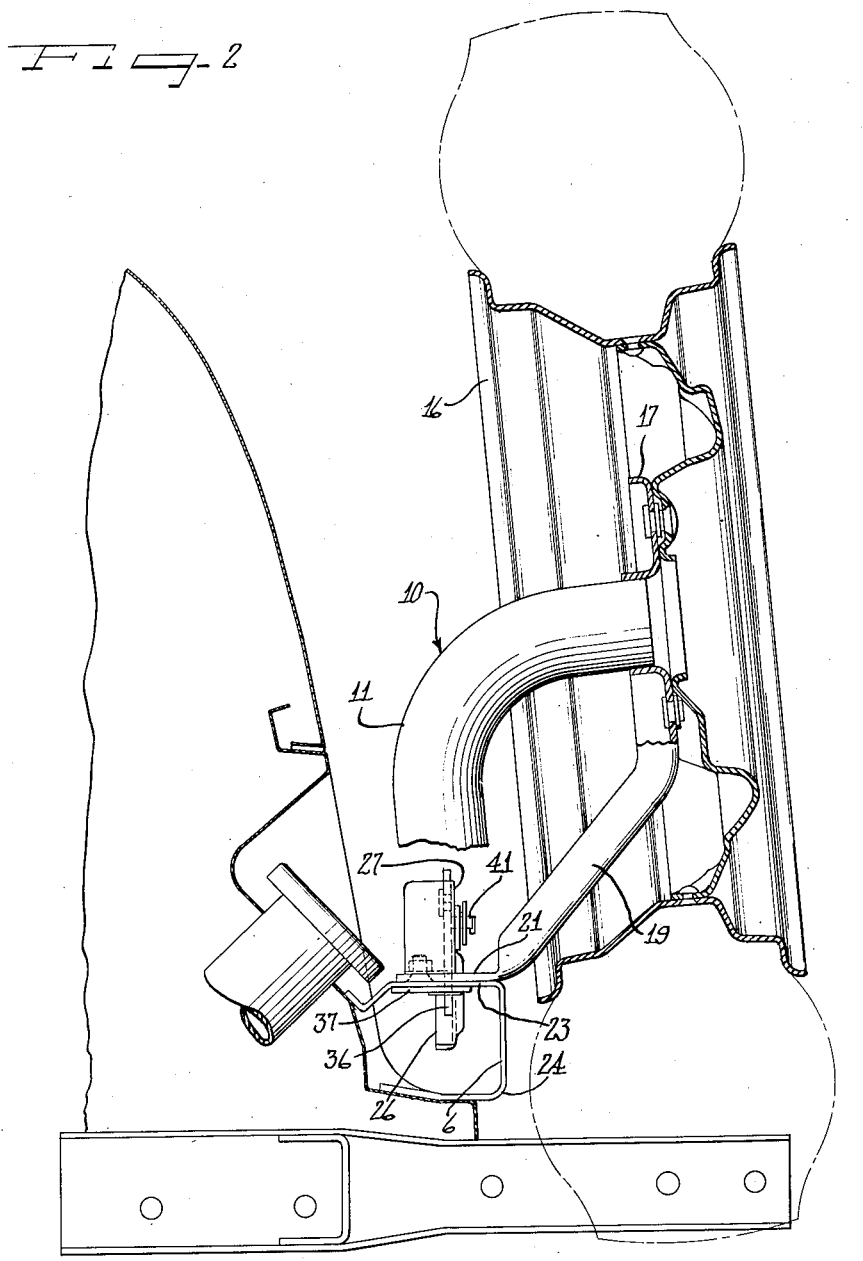

Sept. 25, 1956            E. D. DALL            2,764,330
LATCHING MEANS FOR TIRE CARRIERS OR SIMILAR DEVICES
Filed Jan. 12, 1953            3 Sheets–Sheet 3
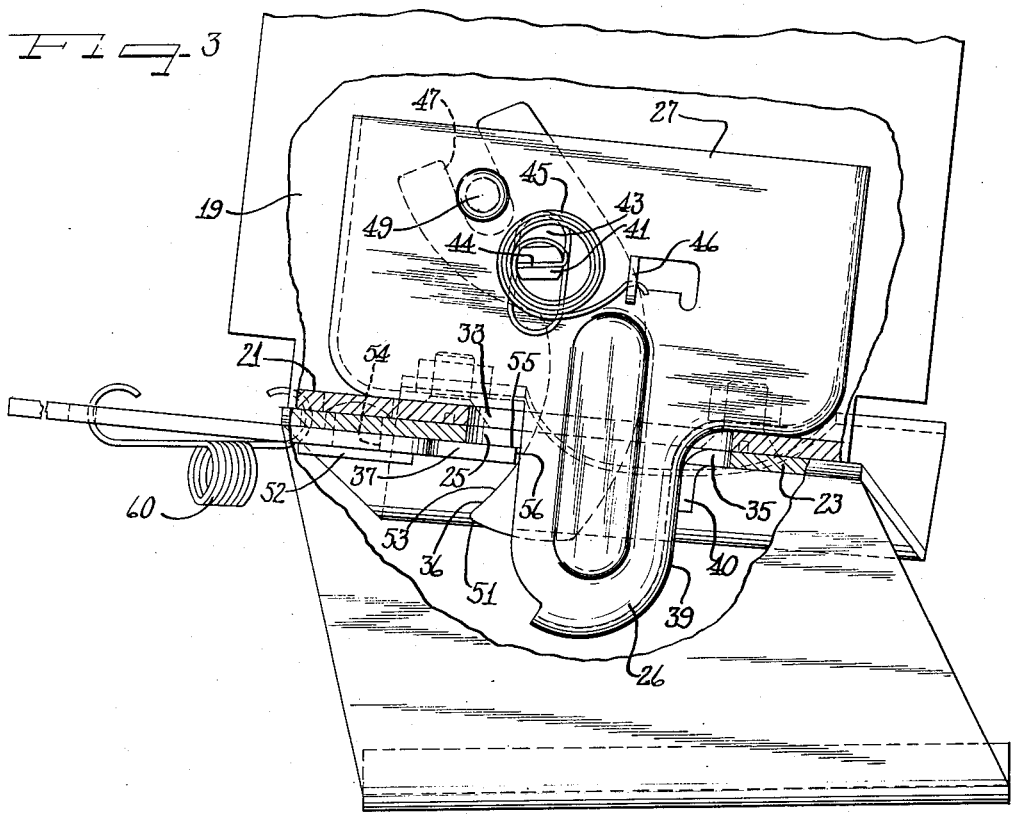
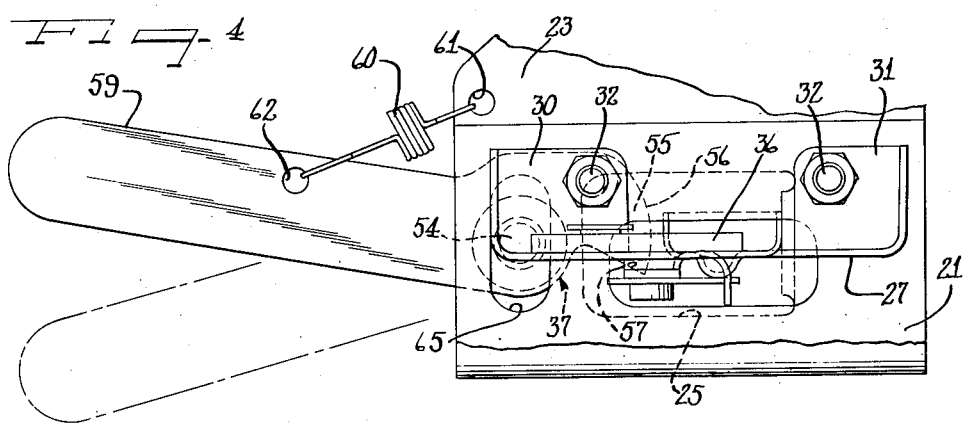
Inventor
Edward D. Dall United States Patent Office 2,764,330
Patented Sept. 25, 1956

2,764,330

LATCHING MEANS FOR TIRE CARRIERS OR SIMILAR DEVICES

Edward D. Dall, Detroit, Mich., assignor to Houdaille Industries, Inc., a corporation of Michigan Application January 12, 1953, Serial No. 330,839

5 Claims. (Cl. 224—42.21)

This invention relates to a latching device and more particularly relates to a simplified form of latch adapted for a tire carrier or other like device.

A principal object of my invention is to provide a simplified and improved form of latching mechanism wherein release of the latch is effected by moving the keeper out of keeper engagement with the latch bolt.

A further and more detailed object of my invention is to provide a self take-up type of rotary latch having a latch bolt biased to take-up on the keeper, and released by releasably moving the keeper away from the latch bolt.

A still further object of my invention is to provide a novel and improved form of self take-up form of latching mechanism wherein the latch is moved from a projected to a retracted position upon engagement with the keeper and is extended along the engaging surface of the keeper to take-up on the keeper upon the tendency of the latch mechanism to move away from the keeper, and wherein the latch is released by releasably moving the keeper out of engagement with the latch bolt.

A further object of my invention is to provide a novel and improved form of latch particularly adapted for a tire carrier for the spare tire of an automobile wherein a main latch bolt is pivotal and slidably movable from a projected to a retracted position upon striking the keeper and is yieldably projected to engage the keeper from its retracted position and is biased to take up on the keeper upon the tendency of the latch bolt to move away from the keeper, assuring that the tire carrier will always be locked and free from vibration when the latch bolt is in engagement with the keeper.

Another object of my invention is to provide a novel and efficient form of tire carrier for the spare tire of an automobile having a bodily movable tire supporting member releasably latched in a stationary position, having a latch bolt slidably and pivotally movable in a plane generally parallel to the plane of movement of the tire carrier and tire when being moved to a latched position, releasing the latch by moving the keeper out of engagement with the latch bolt.

A still further object of my invention is to provide a novel and improved form of latch in which the latch bolt is continuously biased in a keeper engaging and take-up position, and is released by movement of the keeper out of engagement with the latch bolt.

A still further object of my invention is to provide a releasable keeper accommodating separable movement of one latched part with respect to the other by moving the keeper out of engagement with the latch bolt.

These and other objects of my invention will appear from time to time as the following specification proceeds and with reference to the accompanying drawings wherein:

Figure 2 is a fragmentary vertical sectional view taken through the tire carrier and the rear end portion of the rear deck of an automobile, with certain parts broken away in order to illustrate certain other details of my invention not shown in Figure 1;

Figure 3 is an end view of the latching mechanism shown in Figure 1 drawn to an enlarged scale, with certain parts of the tire carrier and bracket therefor broken away, and certain parts of the bracket and latch plate shown in section; and Figure 4 is a plan view of the latch shown in Figure 3, drawn to a reduced scale and showing the releasable keeper in detail.

Figure 1:
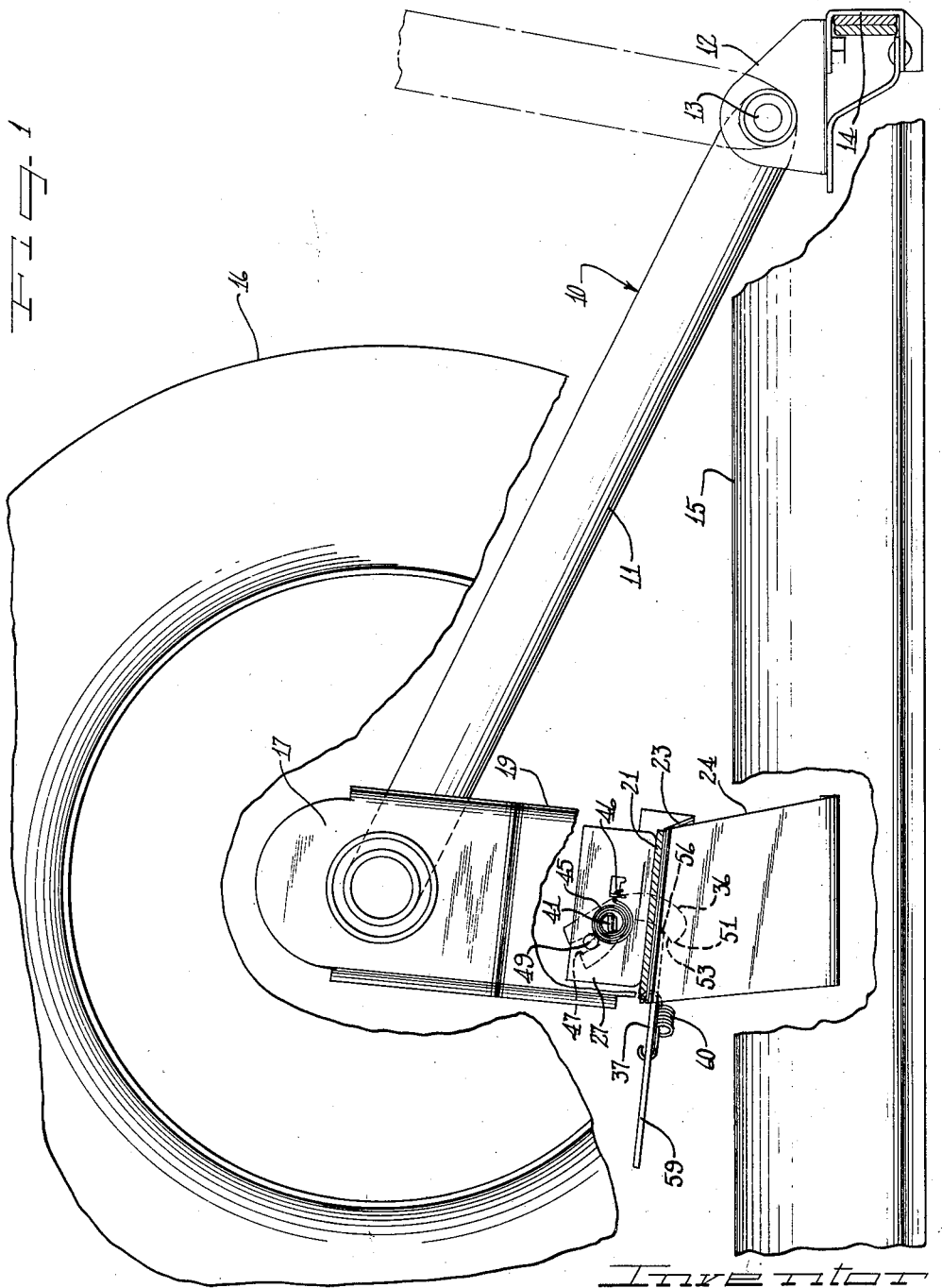
Figure 1 is a fragmentary end view of a tire carrier and latch constructed in accordance with my invention looking toward the tire carrier from the rear end of an automobile, with parts of the tire and tire carrier broken away and with other parts shown in section.

In the embodiment of my invention illustrated in the drawings, reference character 10 indicates generally the tire carrier of an automobile, herein shown as having a swingable arm 11 pivoted to a bracket 12 on a pivot pin 13, extending longitudinally of the automobile. The bracket 12 is herein shown as being secured to a support 14 for a rear bumper 15, and as mounting the arm 11 for pivotal movement in a vertical plane about the axis of the pin 13, to accommodate the tire carrier and a rubber tired wheel 16 carried thereby, to be moved vertically out of the path of the rear deck of the automobile, to afford access to the luggage compartment, without removal of the wheel and tire from the tire carrier.

The arm 11 is shown as having a carrier bracket 17 secured to the inner end thereof, to which the wheel 16 may be detachably bolted in a well known manner. The carrier bracket 17 is shown as having an arm 19 extending downwardly and inwardly therefrom having a relatively flat engaging end portion 21 engageable with and resting on the upper supporting surface of a corresponding plate 23 of a bracket 24. The bracket 24 is shown as being secured to the frame of the automobile just rearwardly of the rear deck thereof (see Figure 2) and is shown as being of a generally U-shaped form in cross-section with the top plate 23 inclined transversely with respect to the bumper 15 and extending radially with respect to the center of the pivot pin 13. The plate 23 is shown as having a rectangular aperture 25 therein to receive a nose 26 projecting downwardly from a lock plate 27, upon latching movement of the carrier. The lock plate 27 may be stamped from a sheet of steel, and is shown as having inwardly extending flanged portions 30 and 31 at opposite sides of the nose 26, affording a means to secure the lock plate to the plate 21 of the carrier bracket 19. As herein shown nuts and bolts 32, 32 extending through said flanged portions and the plate 21, are provided to secure the lock plate 27 to the top of the plate 21 of the carrier bracket 19. The nose 26 is shown as extending downwardly from the flanges 30 and 31 through an opening 33 in the plate 21 of the carrier bracket 19, and through the opening 25 in the plate 23 when a latch bolt 36 of the latching mechanism is in latching engagement with a keeper 37, as shown in Figure 3 of the drawings.

The flange 31 is shown as extending downwardly along the nose 26 as indicated by reference character 39 to reinforce said nose and to come into guiding engagement with a depending tongue 40 depending from the plate 23 and forming one margin of the opening 24 and guiding the nose 26 as the latch bolt 36 moves into latching engagement with the keeper 37. The opposite side of the nose 26 from the flange 39 is shown as being open to accommodate the latch bolt 36 to move laterally therefrom, when moving to a latched position. The latch bolt 36 is shown as having a pin 41 secured thereto intermediate its ends, and as extending therefrom through a slot 43 in the lock plate 27. The slot 43 is shown as extending along the lock plate 27 in a plane generally perpendicular to the plane of the plate 21 of the bracket 19. The pin 41 is shown as having a transverse slot 44, to receive an inturned end of a torsion spring 45. The opposite end of the torsion spring 45 is shown as being hooked to an ear 46 punched outwardly from the plate 27. The spring 45 biases the pin 41 toward the lower end of the slot 43 and also biases the latch bolt 36 in a projected position to rotate in a clockwise direction into engagement with the keeper 37.

The latch 36 is shown as having a bifurcated upper end portion the space between the furcations of which forms a slot 47 extending along said latch at an acute angle with respect to the slot 43. A pin 49 secured to the lock plate 27 is shown as having slidable engagement with the slot 47. The pin 49 reacts against the spring 45 and the slot 43 and guides the latch bolt to retractably move in an arcuate path in a counterclockwise direction upon retraction of latch bolt 36 by engagement with the keeper. Said pin thus maintains the latch bolt to be projected by the torsion spring 45, in a clockwise direction into engagement with the keeper, as a latching nose 51 of the latch bolt moves beyond the edge of the keeper. The latching nose 51 normally projects to one side of the nose 26 of the latch plate 27 in position to strike and be retractibly moved by the keeper during movement of the plate 21 toward the plate 23. The bottom surface of the latching nose 51, therefor, may be termed a strike surface. Extending from the nose 51 and along the side of the latch bolt projecting from the nose 51 is a curved latching or keeping engaging surface 53, biased into latching engagement with the keeper 37 by the torsion spring 45.

The keeper 37 is shown as abutting the bottom of the bracket plate 23 and as being pivotally mounted thereon on a pivot pin 54, mounted on the plate 23. The pin 54 is shown as depending from the plate 23 and as having an enlarged washer 52 secured to its lower end and abutting the bottom surface of the keeper 37 to retain said keeper to the plate 23.

As shown in Figure 4 of the drawings, the keeper 37 is in the form of a lever arm pivotally movable about the axis of the pin 54 and has an upper strike surface 55 underlapping the aperture 25 of the plate 23, and adapted to retractibly move the latch bolt 36, when struck by the nose 51 thereof, and has an arcuate keeper surface 56 engaged by the latching surface 53 of the latch bolt 36 as the latch bolt is moved into a projected latching position by the spring 45. The arcuate surface 56 terminates into an inwardly extending plane surface 57 forming a recess in the keeper to release the keeper from the latch bolt 36, upon pivotal movement of the keeper 37 in a counterclockwise direction. On the opposite side of the axis of the pivot pin 54 from the keeper surface 56 is a lever arm 59 forming a hand lever, for manually moving the keeper out of engagement with the latch bolt 36. The keeper 37 is shown as being biased into position to be engaged by the latch bolt by a tension spring 60 connected or hooked at one end to an apertured portion 61 of the bracket plate 23 and connected or hooked at its opposite end to an apertured portion 62 of the lever arm 59. A slot 65 is provided in the plate 21 to receive the head of the pivot 54 when the plate 21 is resting on the plate 23. If desired a well known form of key operated mechanism may be provided for the keeper 37. Such mechanism is no part of my present invention so is not herein shown or described.

Referring now to the operation of the latch mechanism and to Figures 1 and 2 and assuming that the arm 11 of the carrier 10 is in the broken line position shown in Figure 1, the latch bolt 36 when out of engagement with the keeper, will be biased in an extended position with respect to the nose 26 by the spring 45. Upon swinging movement of the carrier 10 downwardly toward the bracket plate 23, the nose 51 of the latch bolt will strike the upper strike surface 55 of the keeper 37. This will retractably move the latch bolt upwardly along the slot 43 in a counterclockwise direction against the bias of the torsion spring 45 under control of the pins 41 and 49 until the end 51 of the latch bolt clears the marginal edge of the keeper surface 56. The latch bolt 36 being released from the strike surface of the keeper will move downwardly along the keeper surface 36. The torsion spring 45 then will project the latch bolt downwardly along the keeper surface and along the slot 43 in a clockwise direction under control of the pin 41 and the pin 49 slidably engaged by the slot 47 and project the keeper engaging surface 53 of the latch bolt downwardly along the keeper surface 56 of the keeper into locking engagement therewith.

It should here be understood that the torsion spring 45 continually exerts a force on the latch bolt to project the latch bolt downwardly along the slot 43, and at the same time to pivot the latch bolt in a clockwise direction into engagement with the keeper, and that said spring continually exerts a take up force on the keeper until the pin 41 reaches the lower end of the slot 43. The slot 43, however, is sufficiently long that the pin 41 will not normally reach the lower end thereof to assure tight engagement of the plates 21 and 23 with each other and thus prevent vibration or rattling of the latched parts.

When it is desired to release the latch, to swing the tire carrier upwardly out of the way of the rear deck door, it is simply necessary to grasp the lever arm 59 of the keeper 37 and pivot the keeper in the counterclockwise direction out of engagement with the latch bolt, at which time the latch is released.

It will be understood that modifications and variations may be effected in this invention without departing from the scope of the novel concepts thereof.

I claim as my invention:

1. A latch for association with a movable tire carrier and a cooperating stationary member, to retain the tire carrier from movement, comprising a latch assembly mounted on one of the members and comprising a latch plate having a bodily shiftable elongated rotary latch bolt mounted thereon having a nose forming a strike surface and having an elongated keeper engaging surface extending therefrom and a spring biasing said latch bolt into a projected position, a keeper pivotally mounted on the other of said members and having a plane surface generally perpendicular to the plane of movement of the movable member and adapted to be engaged by the nose of said latch bolt upon movement of said members toward each other and retract the latch bolt against the bias of said spring, and also having an arcuate keeper surface having keeper engagement with keeper engaging surface of said latch bolt as said latch bolt is extended from its retracted to its projected position by said torsion spring, said keeper also having a lever arm extending from its pivot in position to manually move said keeper out of keeper engagement with the latch bolt to release the latch, and spring means connected with said lever arm and biasing said keeper in position to be engaged by the latch bolt.

2. A keeper for association with a latch bolt comprising a pivoted keeper member having a plane strike surface extending perpendicular to the pivotal axis of the keeper and adapted to engage and retract a latch bolt upon movement thereof toward the keeper, said keeper member also having an arcuate keeper surface extending perpendicular to said strike surface parallel to the axis of pivotal movement of said keeper for keeper engagement with a latch bolt and having a projecting arm affording a means for moving said keeper surface out of engagement with the latch bolt.

3. In a keeper for association with a latch bolt and operable to release the latch bolt by movement of the keeper out of engagement therewith, a pivoted member having a strike surface on one side thereof and an arcuate keeper surface extending along an edge thereof generally perpendicular to said strike surface, struck from an arc coaxial with the axis of the pivot of said member, spring means biasing said member in a latch engaging position, and said keeper having an arm projecting from the pivot thereof affording a means for grasping by the hand to move said keeper out of engagement with the latch.

4. In a latch for association with a movable tire carrier including a bodily movable wheel carrying bracket and a cooperating stationary support member therefor, a keeper movably mounted on one of the members, a latch assembly mounted on the other of the members comprising a latch plate having a bodily shiftable rotary latch bolt slidably and pivotally mounted thereon and retractibly moved by the keeper during relative movement of said bracket toward said stationary member, a shiftable pivot support for said latch bolt on said latch plate, a spring biasing said latch bolt into a projected position along said shiftable pivot support from a retracted position into engagement with the keeper, a fixed pivot pin having slidable engagement with said latch bolt on the opposite side of said pivotal support from the latching surface thereof, and guiding said latch to move against said spring in a retractable direction upon striking engagement thereof with the keeper and to be pivotally projected by said spring from the retracted position thereof into latching engagement with the keeper, and spring means biasing said keeper, in position to be engaged by said latch bolt, and accommodating said keeper to be moved out of keeper engagement with said latch bolt, to release the latch.

5. In a latch for association with a movable tire carrier including a bodily movable wheel carrying bracket and a cooperating stationary support therefor, a keeper pivotally mounted on said support and having a plane strike surface perpendicular to the plane of movement of said bracket and a keeper surface along an edge thereof, in radial alignment with the pivotal axis thereof, a latch assembly mounted on said bracket and comprising a latch plate having a bodily shiftable latch bolt retractibly movable therealong by engagement with said plane strike surface of said keeper during relative movement of said members, one toward the other, a shiftable pivot support for said latch bolt on said latch plate, a pin fixedly mounted on said latch plate and having slidable dogging engagement with said latch bolt and dogging said latch bolt in a latched position, a spring projecting said latch bolt along said shiftable pivot support toward said stationary support into engagement with the keeper surface of said keeper, a spring biasing said keeper into position to be struck by said latch bolt and to have keeper engagement therewith, and said keeper having an arm extending from the pivot thereof affording a means for releasably moving the keeper surface thereof out of engagement with said latch bolt, to release the latch.

References Cited in the file of this patent
UNITED STATES PATENTS

| | | |
|---|---|---|
| 2,029,901 | Voight | Feb. 4, 1936 |
| 2,383,476 | Falsler et al. | Aug. 28, 1945 |
| 2,622,909 | Endter | Dec. 23, 1952 |
| 2,625,420 | Endter | Jan. 13, 1953 |
| 2,645,394 | De Bord | July 14, 1953 |